(12) United States Patent
Tian et al.

(10) Patent No.: US 9,438,323 B2
(45) Date of Patent: Sep. 6, 2016

(54) METHOD AND DEVICE FOR SENDING USER-SPECIFIC REFERENCE SIGNAL

(71) Applicant: Huawei Technologies Co., Ltd., Shenzhen (CN)

(72) Inventors: Tingjian Tian, Shenzhen (CN); Hua Yan, Shenzhen (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/933,763

(22) Filed: Nov. 5, 2015

(65) Prior Publication Data

US 2016/0056869 A1  Feb. 25, 2016

Related U.S. Application Data (63) Continuation of application No. PCT/CN2014/077262, filed on May 12, 2014.

(30) Foreign Application Priority Data

May 10, 2013 (CN) .......................... 2013 1 0172592

(51) Int. Cl.
| | |
|---|---|
| *H04B 7/02* | (2006.01) |
| *H04B 7/04* | (2006.01) |
| *H04L 29/06* | (2006.01) |
| *H04B 7/06* | (2006.01) |
| *H04B 1/04* | (2006.01) |

(52) U.S. Cl.
CPC .......... *H04B 7/0421* (2013.01); *H04B 1/0475* (2013.01); *H04B 7/02* (2013.01); *H04B 7/0456* (2013.01); *H04B 7/0617* (2013.01); *H04L 29/06* (2013.01)

(58) Field of Classification Search
CPC ............. H04L 5/0051; H04L 27/2613; H04L 27/2601; H04L 25/0242; H04L 5/006; H04L 27/2636; H04B 7/0626; H04B 7/0452; H04B 7/024; H04B 7/0639; H04B 1/1027; H04B 17/318; H04B 1/7107; H04B 7/04; H04B 15/00; H04B 1/04; H04B 7/0617; H04B 7/0421; H04W 52/325; H04W 72/1289; H04W 52/143; H04W 48/12; H04W 52/0206; H04W 52/0209; H04W 72/042; H04W 72/046; H04J 11/0079; H04J 11/0023
USPC .......... 375/346, 260, 349, 267, 295; 455/103
See application file for complete search history.

(56) References Cited

U.S. PATENT DOCUMENTS

| | | | |
|---|---|---|---|
| 2010/0260288 | A1 | 10/2010 | Aoki et al. |
| 2012/0307706 | A1 | 12/2012 | Nakano et al. |
| 2012/0327881 | A1 | 12/2012 | Nakano et al. |
| 2014/0301271 | A1* | 10/2014 | Xu .................. H04W 24/02 370/328 |

FOREIGN PATENT DOCUMENTS

| | | |
|---|---|---|
| CN | 101800993 A | 8/2010 |
| CN | 102340377 A | 2/2012 |
| CN | 102832982 A | 12/2012 |

OTHER PUBLICATIONS

Peh et al., "Power and Modulo Loss Tradeoff with Expanded Soft Demapper for LDPC Coded GMD-THP MIMO Systems," IEEE Transactions on Wireless Communications, vol. 8, No. 2, pp. 714-724, Institute of Electrical and Electronics Engineers, New York, New York (Feb. 2009).

* cited by examiner

*Primary Examiner* — Rahel Guarino (74) *Attorney, Agent, or Firm* — Leydig, Voit & Mayer, Ltd.

(57) ABSTRACT

Disclosed are a method and device for sending a user-specific reference signal. The method provided in the present invention includes: determining a modulus identification, and performing interference elimination processing on a user-specific reference signal according to the modulus identification to obtain the user-specific reference signal after the interference elimination processing; performing beamforming processing on the user-specific reference signal after the interference elimination processing to obtain a beamforming reference signal; and performing inverse fast fourier transform (IFFT) and digital-analog conversion on the beamforming reference signal to obtain an analog signal of the user-specific reference signal, and sending the analog signal to a user terminal.

15 Claims, 4 Drawing Sheets

METHOD AND DEVICE FOR SENDING USER-SPECIFIC REFERENCE SIGNAL

CROSS-REFERENCE TO RELATED APPLICATIONS

This application is a continuation of International Patent Application No. PCT/CN2014/077262, filed on May 12, 2014, which claims priority to Chinese patent application No. 201310172592.0, filed on May 10, 2013, both of which are incorporated herein by reference in their entireties.

TECHNICAL FIELD

The present disclosure relates to the field of communications, and in particular, to a method and a device for transmitting a user-specific reference signal.

BACKGROUND

The Multiple-Input Multiple-Out (MIMO) technology is widely used in wireless communication systems such as the Long Term Evolution (LTE). In the Multi-User MIMO (MU-MIMO) technology, a key processing step is precoding. In the MIMO technology, a base station transmits signals to multiple terminals using a same frequency and a same time slot; and since the multiple terminals cannot corporate with each other, mutual interferences among the multiple terminals are caused and signals received by the terminals are of poor quality. The mutual interferences among the terminals can be reduced through performing a precoding processing at the base station side. Specifically, when performing the precoding processing, the base station needs to obtain a state of a downlink channel and perform the precoding processing using the state of the downlink channel. It should be noted that, if the precoding processing has been performed by the base station, the terminals need to obtain downlink channel response information and perform MIMO detections on received data symbols by using the downlink channel response information, such that the terminals can correctly receive the signals transmitted by the base station. A method for enabling a terminal to obtain the downlink channel response information includes that: mapping a user-specific reference signal to a resource block scheduled by the terminal, by the base station through transmitting the user-specific reference signal to the terminal, such that the terminal obtains the downlink channel response information through channel estimation. The precoding may be classified into linear precoding and nonlinear precoding generally, and the Tomlinson Harashima Precoding (THP) is a typical nonlinear precoding technology. During a process of transmitting the user-specific reference signal, the base station needs to perform an interference elimination processing on the user-specific reference signal, such that the terminal obtains a relative accurate state of the downlink channel. For the linear precoding technology, a same interference elimination processing is performed on the user-specific reference signal and a data signal. However, for the nonlinear precoding technology, the power of the user-specific reference signal may be increased through the interference elimination processing, and a transmitting power for the data signal may be decreased due to a limited transmitting power of the base station, thereby degrading performance of a communication system. In order to control the transmitting power for the user-specific reference signal, a modulus operation needs to be performed to control the power of the user-specific reference signal. However, the user-specific reference signal may have a modulus offset through the modulus operation, and the modulus offset of the user-specific reference signal can not be obtained by the terminal; hence, a relative large error may be caused in the channel estimation performed by the terminal, and the communication system is of poor performance.

SUMMARY

It is provided a method and a device for transmitting a user-specific reference signal according to embodiments of the present disclosure, to improve the performance of a communication system in which user-specific reference signals are transmitted, where nonlinear precoding is applied in the communication system.

Technical solutions according to the embodiments of the present disclosure are described as follows.

In a first aspect, it is provided a method for transmitting a user-specific reference signal according to an embodiment of the present disclosure, and the method includes:

determining a modulus identification, and performing an interference elimination processing on a user-specific reference signal based on the modulus identification to obtain an interference-eliminated user-specific reference signal;

performing a beamforming processing on the interference-eliminated user-specific reference signal to obtain a beamformed reference signal; and performing an Inverse Fast Fourier Transformer (IFFT) and a digital-to-analogue conversion on the beamformed reference signal to obtain an analogue signal for the user-specific reference signal, and transmitting the analogue signal to a user terminal.

In a first possible implementation, before the determining the modulus identification, the method may further include:

determining values of a modulus loss and a power loss; where the determining values of a modulus loss and a power loss specifically include:

determining the modulus loss based on a difference between a signal-to-noise ratio obtained in a case that a modulus operation is performed on a data symbol and a signal-to-noise ratio obtained in a case that no modulus operation is performed on the data symbol; and determining the power loss based on a preset power factor.

In conjunction with the first possible implementation of the first aspect, in a second possible implementation, the determining the modulus identification may include:

determining the modulus identification as 0 for instructing a modulus unit to perform no modulus operation on the data symbol, in a case that the modulus loss is greater than the power loss; and the performing the interference elimination processing on the user-specific reference signal based on the modulus identification may include:

determining an interference elimination amount as 0, i.e., performing no interference elimination processing on the user-specific reference signal, in a case that the modulus identification is 1.

In conjunction with the first possible implementation of the first aspect, in a third possible implementation, the determining the modulus identification may include:

determining the modulus identification as 0 for instructing a modulus unit to perform no modulus operation on the data symbol, in a case that the modulus loss is greater than the power loss; and the performing the interference elimination processing on the user-specific reference signal based on the modulus identification may include:

determining an interference elimination amount with a preset approach, and performing the interference elimination processing on the user-specific reference signal according to the interference elimination amount, in a case that the modulus identification is 0.

In conjunction with the third possible implementation of the first aspect, in a fourth possible implementation, before the performing the interference elimination processing on the user-specific reference signal based on the modulus identification, the method may further include:

performing power control on the user-specific reference signal based on the preset power factor, in a case that the modulus identification is 0.

In a second aspect, it is provided a device for transmitting a user-specific reference signal according to an embodiment of the present disclosure, where the device is applied to a base station and the device includes:

a determination unit, configured to determine a modulus identification;

an interference elimination unit, configured to an interference elimination processing on a user-specific reference signal based on the modulus identification determined by the determination unit to obtain an interference-eliminated user-specific reference signal;

a beamforming unit, configured to perform a beamforming processing on the interference-eliminated user-specific reference signal to obtain a beamformed reference signal; and a radio frequency transmitting unit, configured to perform an IFFT and a digital-to-analogue conversion on the beamformed reference signal to obtain an analogue signal for the user-specific reference signal; and transmit the analogue signal to a user terminal.

In a first possible implementation, the determination unit may be further configured to determine values of a modulus loss and a power loss;

specifically, the determination unit may be configured to determine the modulus loss based on a difference between a signal-to-noise ratio obtained in a case that a modulus operation is performed on a data symbol and a signal-to-noise ratio obtained in a case that no modulus operation is performed on the data symbol, and determine the power loss based on a preset power factor.

In conjunction with the first possible implementation of the second aspect, in a second possible implementation, the determination unit may be configured to determine the modulus identification as 1 for instructing a modulus unit to perform a modulus operation on the data symbol, in a case that the modulus loss is less than the power loss; and the interference elimination unit may be configured to determine an interference elimination amount as 0, i.e., perform no interference elimination processing on the user-specific reference signal, in a case that the modulus identification is determined as 1 by the determination unit.

In conjunction with the first possible implementation of the second aspect, in a third possible implementation, the determination unit may be configured to determine the modulus identification as 0 for instructing a modulus unit to perform no modulus operation on the data symbol, in a case that the modulus loss is greater than the power loss; and the interference elimination unit may be configured to determine an interference elimination amount with a preset approach, and perform an interference elimination processing on the user-specific reference signal according to the interference elimination amount, in a case that the modulus identification is determined as 0 by the determination unit.

In conjunction with the first possible implementation of the second aspect, in a fourth possible implementation, the device may further include:

a power control unit, configured to perform power control on the user-specific reference signal based on the preset power factor, in a case that the modulus identification is determined as 0 by the determination unit.

With the method and the device for transmitting a user-specific reference signal according to the embodiments of the present disclosure, it is not necessary to perform modulus operation on the user-specific reference signal, and the user-specific reference signal may not have any offset. Therefore, a relative accurate state of a downlink channel can be obtained by the terminal, the accuracy of the channel estimation is enhanced, and performance of the communication system is improved.

DETAILED DESCRIPTION OF THE EMBODIMENTS

Technical solutions according to embodiments of the present disclosure are described clearly and completely hereinafter in conjunction with drawings used in the embodiments of the present disclosure. Apparently, the described embodiments are only some embodiments of the present disclosure rather than all the embodiments. Any other embodiments obtained by those skilled in the art based on the embodiments of the present disclosure without any creative work fall in the scope of protection of the present disclosure.

First Embodiment

Figure 1:
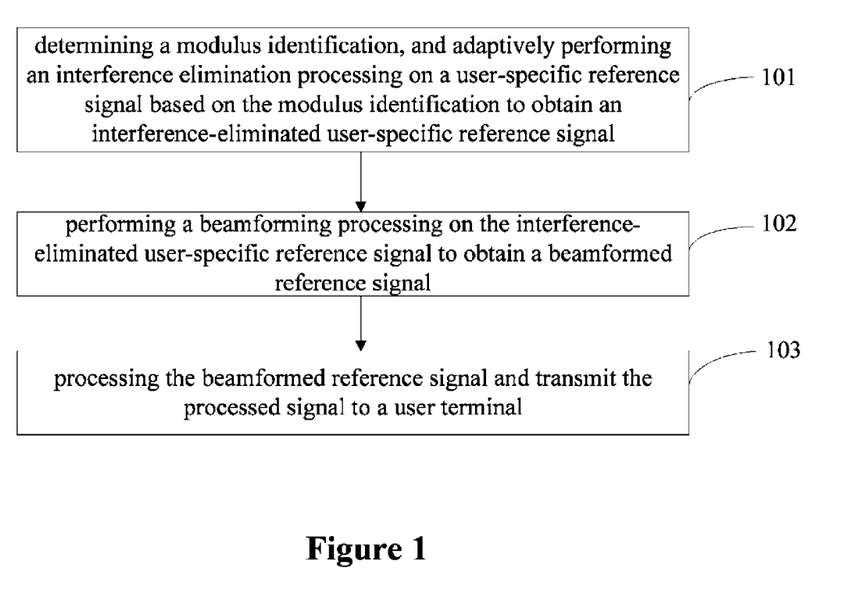
FIG. 1 is a schematic flowchart of a method for transmitting a user-specific reference signal according to a first embodiment of the present disclosure.

It is provided a method for transmitting a user-specific reference signal according to an embodiment of the present disclosure. The method is applied to a wireless communication system having an MIMO function. The method may be executed by a base station or an access point AP, to transmit a user-specific reference signal; and the user-specific reference signal is mapped to a resource block scheduled by a terminal, such that downlink channel response information may be obtained by the terminal through channel estimation. As shown in FIG. 1, the method includes steps 101 to 103.

101, determining a modulus identification, and performing an interference elimination processing on a user-specific reference signal based on the modulus identification to obtain an interference-eliminated user-specific reference signal.

The method according to the embodiment of the present disclosure may be implemented by a base station or a specified functional module of a base station, which is not limited here.

102, performing a beamforming processing on the interference-eliminated user-specific reference signal to obtain a beamformed reference signal.

103, performing an IFFT and a digital-to-analogue conversion on the beamformed reference signal to obtain an analogue signal for the user-specific reference signal, and transmitting the analogue signal to a user terminal.

With the method for transmitting a user-specific reference signal according to the embodiment of the present disclosure, it is not necessary to perform the modulus operation on the user-specific reference signal, and the user-specific reference signal may not have any offset. Therefore, a relative accurate state of a downlink channel is obtained by the terminal, the accuracy of the channel estimation is enhanced, and performance of the communication system is improved.

Second Embodiment

Figure 2:
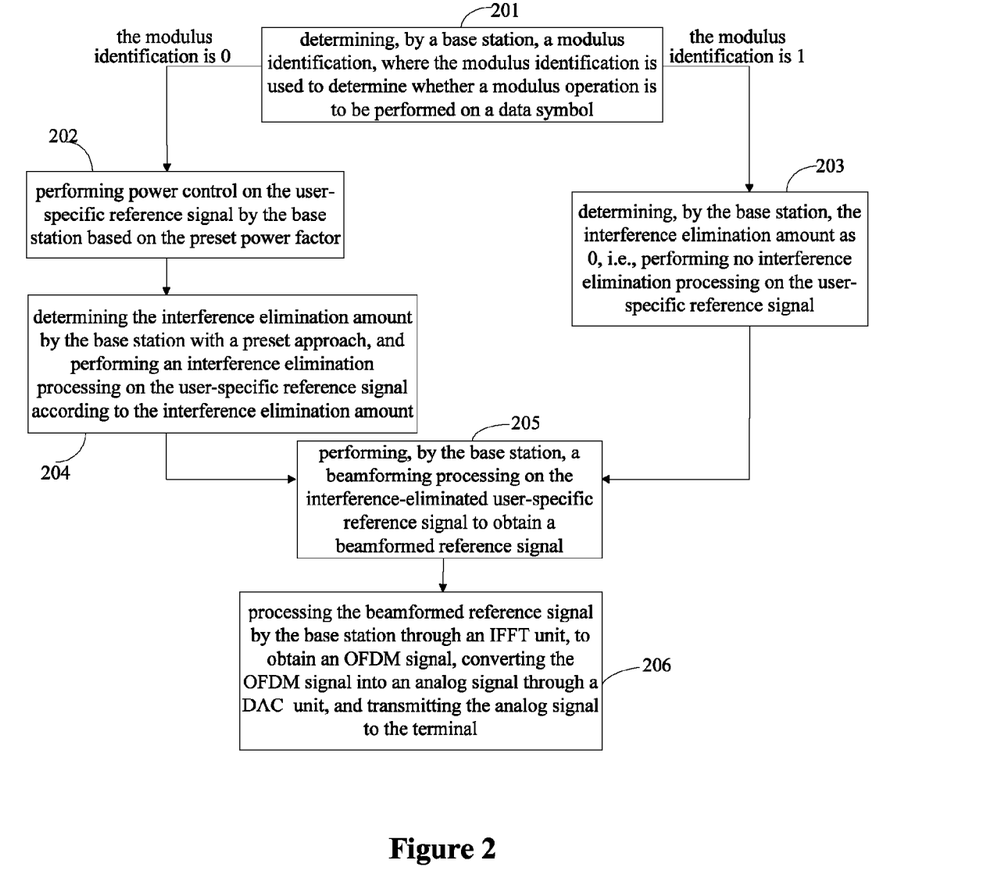
FIG. 2 is a schematic flowchart of a method for transmitting a user-specific reference signal according to a second embodiment of the present disclosure.

Based on the embodiment as shown in FIG. 1, it is further provided a method for transmitting a user-specific reference signal according to an embodiment of the present disclosure. As shown in FIG. 2, the method includes steps 201 to 206.

201, determining, by a base station, a modulus identification, where the modulus identification is used to determine whether a modulus operation is to be performed on a data symbol.

It should be noted that, the modulus operation is mainly used to control the power of an interference-eliminated data symbol. To achieve the same technical effect, alternatively, the base station may perform a power control on the data symbol, i.e., control the power of the data symbol through multiplying the original data symbol by a preset power factor. In a case that the base station controls the power through the modulus operation, a terminal also needs to perform a signal restoration through a modulus operation and demodulate the data symbol by using constellation extension; and during this operation, a performance loss is caused, which may be referred to as "a modulus loss". Similarly, in a case that the power is controlled through multiplying the original data symbol by the power factor, a performance loss is caused, which may be referred to as "a power loss".

Specifically, the modulus loss may be determined by the base station based on a difference between a signal-to-noise ratio obtained in a case that the modulus operation is performed on a data symbol and a signal-to-noise ratio obtained in a case that no modulus operation is performed on the data symbol. For example, in different Modulation and Coding Schemes (MCSs), the modulus loss may be obtained by simulation, i.e., a difference between a signal-to-noise ratio obtained in a case that modulus operation is performed and a signal-to-noise ratio obtained in a case that no modulus operation is performed, when a certain MCS is used and a preset packet error rate (usually, 10%) is reached during receiving a data symbol by a receiving terminal.

In another aspect, the power loss may be determined by the base station based on the preset power factor. For example, after the data symbol is multiplied by the power factor, the receiving terminal determines a value, by which the signal-to-noise ratio of a received data symbol decreases, as the power loss.

In the present embodiment, a following approach may be used by the base station to determine the modulus identification:

determining values of the modulus loss and the power loss; determining, by the base station in a case that the modulus loss is greater than the power loss, the modulus identification to be 0 for instructing a modulus unit to perform no modulus operation on the data symbol; or determining, by the base station in a case that the modulus loss is less than the power loss, the modulus identification to be 1 for instructing the modulus unit to perform a modulus operation on the data symbol.

Specifically, 202 and step 204 are performed in a case that the modulus identification is 0; or step 203 is performed in a case that the modulus identification is 1.

202, performing power control on the user-specific reference signal by the base station based on the preset power factor, in a case that the modulus identification is 0.

Specifically, in a case that the modulus identification is 0, the base station determines that an interference elimination amount of the user-specific reference signal is not 0, and the power of the user-specific reference signal may be increased; hence, the power of the user-specific reference signal needs to be restricted. For example, the base station may control the power of the user-specific reference signal, through a power control unit, by means of multiplying the user-specific reference signal by the preset power factor.

203, determining, by the base station in a case that the modulus identification is 1, the interference elimination amount as 0, i.e., performing no interference elimination processing on the user-specific reference signal.

204, determining the interference elimination amount by the base station with a preset approach, and performing an interference elimination processing on the user-specific reference signal according to the interference elimination amount.

To facilitate understanding, the present embodiment is explained in detail with an example.

It is assumed that a modulated data symbol is a, and a is a complex vector having a dimension of S×1, where S represents the number of terminals; $a_i$ represents a data symbol transmitted from a base station to a terminal i. The base station has N transmitting antennas, and each terminal has one receiving antenna.

Based on an uplink channel estimation or channel state information fed back by the terminals, the base station obtains a channel matrix:

$$H = \begin{bmatrix} h_1 \\ h_2 \\ \vdots \\ h_s \end{bmatrix}$$

A dimension of H is S×N, where $h_i$(i=1, 2, . . . , S) represents a channel matrix of the terminal i, and the dimension of $h_i$ is 1×N.

An LQ decomposition is performed on H: $H=LQ^H$;

where L is a lower triangular matrix with positive elements on the diagonal, which has a dimension of S×S; Q is a beamforming matrix having a dimension of N×S; where $Q^HQ=I$, i.e., each column vector of the matrix Q is a unit vector, different column vectors of the matrix Q are orthogonal to each other, where $Q^H$ represents a conjugate transpose of the matrix Q.

Specifically, the approach for calculating the interference elimination amount in the foregoing step 204 may be described with reference to the following formula:

$$b_1 = 0$$

$$b_i = \begin{cases} \sum_{k=1}^{i-1} \frac{l_{ik}}{l_{ii}} \tilde{a}_k^{(DRS)} \\ 0 \end{cases}$$

no modulus operation is performed on an i-th stream data (the modulus identification is 0)

a modulus operation is performed on an i-th stream data (the modulus identification is 1), $i = 2, \ldots, K$ where $\tilde{a}_k^{(DRS)}$ represents a symbol of a k-th stream interference-eliminated user-specific reference signal; $b_i$ represents an interference elimination amount of an i-th stream reference signal; $l_{ii}$ represents an (i, i)-th element in the matrix L; and $l_{ik}$ represents an (i,k)-th element in the matrix L.

The processing procedures of the above step 202 and step 204 may be understood with reference to the following formula:

$$\tilde{a}_i^{(DRS)} = \lambda_i a_i - b_i$$

where $a_i$ represents a symbol of an i-th stream original user reference signal, and $\lambda_i$ represents the power factor which is used in calculation according to the preset approach. $\lambda_i$ may be determined with the following formula:

$$\lambda_i \begin{cases} \sqrt{1 - \sum_{k=1}^{i-1} \left|\frac{l_{ik}}{l_{ii}}\right|^2}, & \text{no modulus operation is performed on the } i\text{-th stream data} \\ 1 & \text{a modulus operation is performed on the } i\text{-th stream data} \end{cases}$$

It should be noted that, in the present embodiment, with the above step 202 and step 204, the power of the user-specific reference signal is controlled based on the power factor and there is no need to perform the modulus operation; hence, a problem that the user-specific reference signal generates an offset due to the modulus operation is avoided, which facilitates the terminal obtaining a relative accurate state of the downlink channel, enhances the accuracy of the channel estimation, and improves the performance of the communication system. It should be noted that, with the method according to the present embodiment, the number of control signalings may not be increased, thereby saving the signaling overhead.

205, performing, by the base station, a beamforming processing on the interference-eliminated user-specific reference signal to obtain a beamformed reference signal. The processing approach may be understood with reference to the following formula:

$$x^{(DRS)} = \frac{Q\tilde{a}^{(DRS)}}{\sqrt{S}}$$

where $x^{(DRS)}$ represents a beamformed reference signal; Q represents a beamforming matrix; $\tilde{a}^{(DRS)}$ represents an input signal to be beamformed, which is obtained through step 202 and step 204; and S represents the number of terminals.

206, processing the beamformed reference signal by the base station through an Inverse Fast Fourier Transformer (IFFT) unit, to obtain an Orthogonal Frequency Division Multiplexing (OFDM) signal, converting the OFDM signal into an analog signal through a Digital-to-Analog Converter (DAC) unit, and transmitting the analog signal to the terminal.

With the method for transmitting a user-specific reference signal according to the embodiment of the present disclosure, it is not necessary to perform the modulus operation on the user-specific reference signal, and the user-specific reference signal may not have any offset. Therefore, a relative accurate state of a downlink channel is obtained by the terminal, the accuracy of the channel estimation is enhanced, and performance of the communication system is improved. In another aspect, in the present embodiment, it is allowed to perform the interference elimination processing on the user-specific reference signal; hence, the terminal can perform a relative accurate channel estimation and obtain information of interference among data streams, and the quality of the received signal is improved.

Third Embodiment

Figure 3:
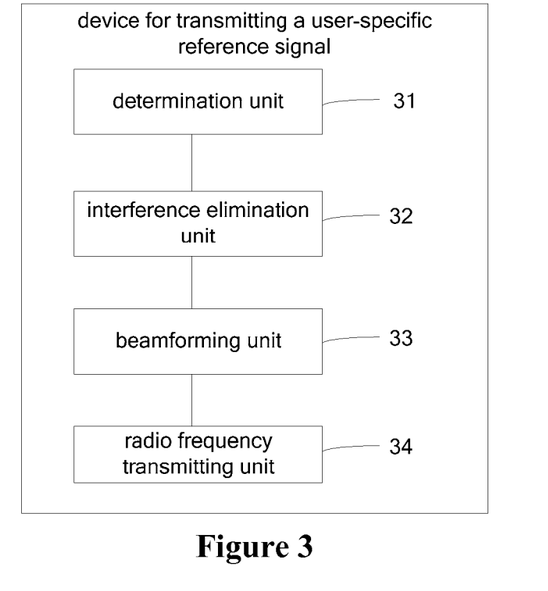
FIG. 3 and FIG. 4 are structural block diagrams of a device for transmitting a user-specific reference signal according to a third embodiment of the present disclosure.

It is provided a device for transmitting a user-specific reference signal according to an embodiment of the present disclosure. The device is applicable to a base station, and can implement the methods shown in FIG. 1 and FIG. 2. As shown in FIG. 3, the device includes a determination unit 31, an interference elimination unit 32, a beamforming unit 33, and a radio frequency transmitting unit 34.

The determination unit 31 is configured to determine a modulus identification.

The interference elimination unit 32 is configured to perform an interference elimination processing on a user-specific reference signal based on the modulus identification determined by the determination unit 31 to obtain an interference-eliminated user-specific reference signal.

The beamforming unit 33 is configured to perform a beamforming processing on the interference-eliminated user-specific reference signal to obtain a beamformed reference signal.

The radio frequency transmitting unit 34 is configured to perform an IFFT inverse fast fourier transform and a digital-to-analogue conversion on the beamformed reference signal to obtain an analogue signal for the user-specific reference signal, and transmit the analogue signal to a user terminal.

In an implementation, the determination unit 31 is further configured to determine values of a modulus loss and a power loss. Specifically, the determination unit 31 is configured to determine the modulus loss based on a difference between a signal-to-noise ratio obtained in a case that a modulus operation is performed on a data symbol and a signal-to-noise ratio obtained in a case that no modulus operation is performed on the data symbol, and determine the power loss based on a preset power factor.

Specifically, the determination unit 31 is configured to determine the modulus identification as 1 for instructing a modulus unit to perform a modulus operation on the data symbol, in a case that the modulus loss is less than the power loss.

The interference elimination unit 32 is configured to determine an interference elimination amount as 0, i.e., perform no interference elimination processing on the user-specific reference signal, in a case that the modulus identification is determined as 1 by the determination unit 31.

The determination unit 31 is further configured to determine the modulus identification as 0 for instructing the modulus unit to perform no modulus operation on the data symbol, in a case that the modulus loss is greater than the power loss.

The interference elimination unit 32 is configured to determine an interference elimination amount with a preset approach and perform an interference elimination processing on the user-specific reference signal according to the interference elimination amount, in a case that the modulus identification is determined as 0 by the determination unit 31.

Figure 4:
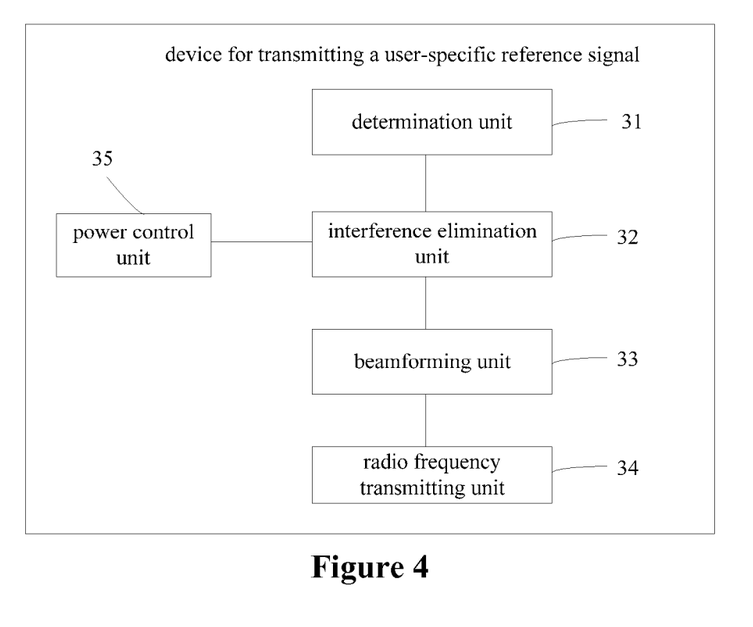

Further, as shown in FIG. 4, the device further includes a power control unit 35.

The power control unit 35 is configured to perform power control on the user-specific reference signal based on the preset power factor, in a case that the modulus identification is determined as 0 by the determination unit 31.

With the device for transmitting a user-specific reference signal according to the embodiment of the present disclosure, it is not necessary to perform modulus operation on the user-specific reference signal, and the user-specific reference signal may not have any offset. Therefore, a relative accurate state of a downlink channel is obtained by the terminal, the accuracy of the channel estimation is enhanced, and performance of the communication system is improved. In another aspect, in the present embodiment, it is allowed to perform the interference elimination processing on the user-specific reference signal; hence, the terminal can perform a relative accurate channel estimation and obtain information of interference among data streams, and the quality of the received signal is improved.

Fourth Embodiment

Figure 5:
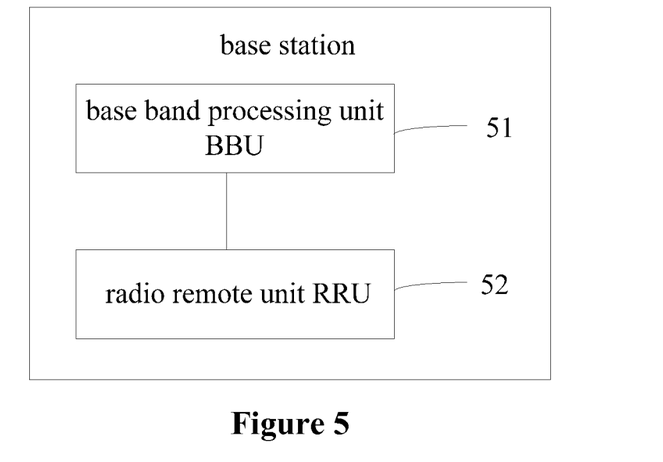
FIG. 5 is a structural block diagram of a base station according to a fourth embodiment of the present disclosure.

It is provided a base station according to an embodiment of the present disclosure. The base station is applied to a communication system supporting nonlinear precoding, and can implement the methods shown in FIG. 1 and FIG. 2. As shown in FIG. 5, the base station includes a Base Band Unit 51 and a Radio Remote Unit 52.

The Base Band Unit (BBU) 51 is configured to determine a modulus identification, perform an interference elimination processing on a user-specific reference signal based on the modulus identification to obtain an interference-eliminated user-specific reference signal, and perform a beamforming processing on the interference-eliminated user-specific reference signal to obtain a beamformed reference signal.

The Radio Remote Unit (RRU) 52 is configured to perform an IFFT inverse fast fourier transform and a digital-to-analogue conversion on the beamformed reference signal to obtain an analogue signal for the user-specific reference signal, and transmit the analogue signal to a user terminal.

In an implementation, the BBU is further configured to determine values of a modulus loss and a power loss. Specifically, the BBU is configured to determine the modulus loss based on a difference between a signal-to-noise ratio obtained in a case that a modulus operation is performed on a data symbol and a signal-to-noise ratio obtained in a case that no modulus operation is performed on the data symbol; and determine the power loss based on a preset power factor.

Specifically, the BBU is configured to determine the modulus identification as 0 for instructing a modulus unit to perform no modulus operation on the data symbol, in a case that the modulus loss is greater than the power loss.

The BBU is further configured to determine the modulus identification as 1 for instructing the modulus unit to perform a modulus operation on the data symbol, in a case that the modulus loss is less than the power loss.

Optionally, the BBU is configured to determine an interference elimination amount with a preset approach, and perform an interference elimination processing on the user-specific reference signal according to the interference elimination amount, in a case that the modulus identification is determined as 0.

The BBU is further configured to determine the interference elimination amount as 0, i.e., perform no interference elimination processing on the user-specific reference signal, in a case that the modulus identification is determined as 1.

Furthermore, the BBU is further configured to perform power control on the user-specific reference signal based on the preset power factor, in a case that the modulus identification is determined as 0.

With the base station according to the embodiment of the present disclosure, it is not necessary to perform modulus operation on the user-specific reference signal for transmitting the user-specific reference signal, and the user-specific reference signal may not have any offset. Therefore, a relative accurate state of a downlink channel is obtained by the terminal, the accuracy of the channel estimation is enhanced, and performance of the communication system is improved. In another aspect, with the base station in the present embodiment, it is allowed to perform the interference elimination processing on the user-specific reference signal; hence, the terminal can perform a relative accurate channel estimation and obtain information of interference among data streams, and the quality of the received signal is improved.

According to the embodiments described above, those skilled in the art can clearly know that the present disclosure may be implemented by means of software in conjunction with necessary general-purpose hardware, or may be implemented by means of hardware, and the software in conjunction with hardware is preferred in many cases. According to such understanding, essential parts or parts contributing to the conventional technology of technical solutions of the present disclosure may be embodied as a computer software product. The computer software product may be stored in a readable storage medium, such as, a floppy disc, a hard disk or an optical disk of a computer, and the computer software product includes multiple instructions for controlling a computer device (which may be a personal computer, a server or a network device or the like) to perform the methods described in various embodiments of the present disclosure.

What is claimed is:

1. A method for transmitting a user-specific reference signal, comprising:
   determining a modulus identification, and performing an interference elimination processing on the user-specific reference signal based on the modulus identification to obtain an interference-eliminated user-specific reference signal;
   performing a beamforming processing on the interference-eliminated user-specific reference signal to obtain a beamformed reference signal; and
   performing an inverse fast fourier transform (IFFT) and a digital-to-analogue conversion on the beamformed reference signal to obtain an analogue signal for the user-specific reference signal, and transmitting the analogue signal to a user terminal.

2. The method according to claim 1, wherein before the determining the modulus identification, the method further comprises:
   determining a modulus loss based on a difference between a signal-to-noise ratio obtained in a case that a modulus operation is performed on a data symbol and a signal-to-noise ratio obtained in a case that no modulus operation is performed on the data symbol; and
   determining a power loss based on a preset power factor.

3. The method according to claim 2, wherein
   the determining the modulus identification comprises:
      determining the modulus identification as 1 for instructing a modulus unit to perform the modulus operation on the data symbol, in a case that the modulus loss is less than the power loss; and the performing the interference elimination processing on the user-specific reference signal based on the modulus identification comprises:
determining an interference elimination amount as 0, and performing no interference elimination processing on the user-specific reference signal, in a case that the modulus identification is 1.

4. The method according to claim 2, wherein
the determining the modulus identification comprises:
determining the modulus identification as 0 for instructing a modulus unit to perform no modulus operation on the data symbol, in a case that the modulus loss is greater than the power loss; and
the performing the interference elimination processing on the user-specific reference signal based on the modulus identification comprises:
determining an interference elimination amount with a preset approach, and performing the interference elimination processing on the user-specific reference signal according to the interference elimination amount, in a case that the modulus identification is 0.

5. The method according to claim 4, wherein before the performing the interference elimination processing on the user-specific reference signal based on the modulus identification, the method further comprises:
performing power control on the user-specific reference signal based on the preset power factor, in a case that the modulus identification is 0.

6. A base station, comprising:
a processor; and
a non-transitory processor-readable medium having processor-executable instructions stored thereon that, when executed by the processor, cause the base station to:
determine a modulus identification;
perform an interference elimination processing on a user-specific reference signal based on the modulus identification to obtain an interference-eliminated user-specific reference signal;
perform a beamforming processing on the interference-eliminated user-specific reference signal to obtain a beamformed reference signal;
perform an inverse fast fourier transform (IFFT) and a digital-to-analogue conversion on the beamformed reference signal to obtain an analogue signal for the user-specific reference signal; and
transmit the analogue signal to a user terminal.

7. The base station according to claim 6, wherein the instructions further cause the base station to:
determine values of a modulus loss and a power loss;
wherein determining the modulus loss is based on a difference between a signal-to-noise ratio obtained in a case that a modulus operation is performed on a data symbol and a signal-to-noise ratio obtained in a case that no modulus operation is performed on the data symbol, and
wherein determining the power loss is based on a preset power factor.

8. The base station according to claim 7, wherein:
determining the modulus identification comprises:
determining the modulus identification as 1 for instructing a modulus unit to perform the modulus operation on the data symbol, in a case that the modulus loss is less than the power loss; and
performing the interference elimination processing comprises:
determining an interference elimination amount as 0, and performing no interference elimination processing on the user-specific reference signal, in a case that the modulus identification is determined as 1.

9. The base station according to claim 7, wherein:
determining the modulus identification comprises determining the modulus identification as 0 for instructing a modulus unit to perform no modulus operation on the data symbol, in a case that the modulus loss is greater than the power loss; and
performing the interference elimination processing comprises determining an interference elimination amount with a preset approach, and performing an interference elimination processing on the user-specific reference signal according to the interference elimination amount, in a case that the modulus identification is determined as 0.

10. The base station according to claim 9, wherein the instructions further cause the base station to:
perform power control on the user-specific reference signal based on the preset power factor, in a case that the modulus identification is determined as 0.

11. A non-transitory computer-readable medium storing therein a set of processor-executable instructions that, when executed by a processor, cause the processor to execute the steps of:
determining a modulus identification, and performing an interference elimination processing on a user-specific reference signal based on the modulus identification to obtain an interference-eliminated user-specific reference signal;
performing a beamforming processing on the interference-eliminated user-specific reference signal to obtain a beamformed reference signal; and
performing an inverse fast fourier transform (IFFT) and a digital-analogue conversion on the beamformed reference signal to obtain an analogue signal for the user-specific reference signal, and transmitting the analogue signal to a user terminal.

12. The non-transitory computer-readable medium according to claim 11, wherein the processor-executable instructions stored in the computer-readable medium further cause the processor to execute, before the determining the modulus identification, the steps of:
determining a modulus loss based on a difference between a signal-to-noise ratio obtained in a case that a modulus operation is performed on a data symbol and a signal-to-noise ratio obtained in a case that no modulus operation is performed on the data symbol; and
determining a power loss based on a preset power factor.

13. The non-transitory computer-readable medium according to claim 12, wherein
the determining the modulus identification comprises:
determining the modulus identification as 1 for instructing a modulus unit to perform the modulus operation on the data symbol, in a case that the modulus loss is less than the power loss; and
the performing the interference elimination processing on the user-specific reference signal based on the modulus identification comprises:
determining an interference elimination amount as 0, and performing no interference elimination processing on the user-specific reference signal, in a case that the modulus identification is 1.

14. The non-transitory computer-readable medium according to claim 12, wherein
the determining the modulus identification comprises:
determining the modulus identification as 0 for instructing a modulus unit to perform no modulus operation on the data symbol, in a case that the modulus loss is greater than the power loss; and
the performing the interference elimination processing on the user-specific reference signal based on the modulus identification comprises:
determining an interference elimination amount with a preset approach, and performing the interference elimination processing on the user-specific reference signal according to the interference elimination amount, in a case that the modulus identification is 0.

15. The non-transitory computer-readable medium according to claim 14, wherein the processor-executable instructions stored in the computer-readable medium further cause the processor to execute, before the performing the interference elimination processing on the user-specific reference signal based on the modulus identification, the steps of:
performing power control on the user-specific reference signal based on the preset power factor, in a case that the modulus identification is 0.

* * * * *